Aug. 21, 1962  F. M. SAYFORD, JR  3,049,979
CUP FORMING METHOD AND APPARATUS

Filed Dec. 12, 1960  9 Sheets-Sheet 1

INVENTOR
FRANK M. SAYFORD JR.
BY
ATTORNEY

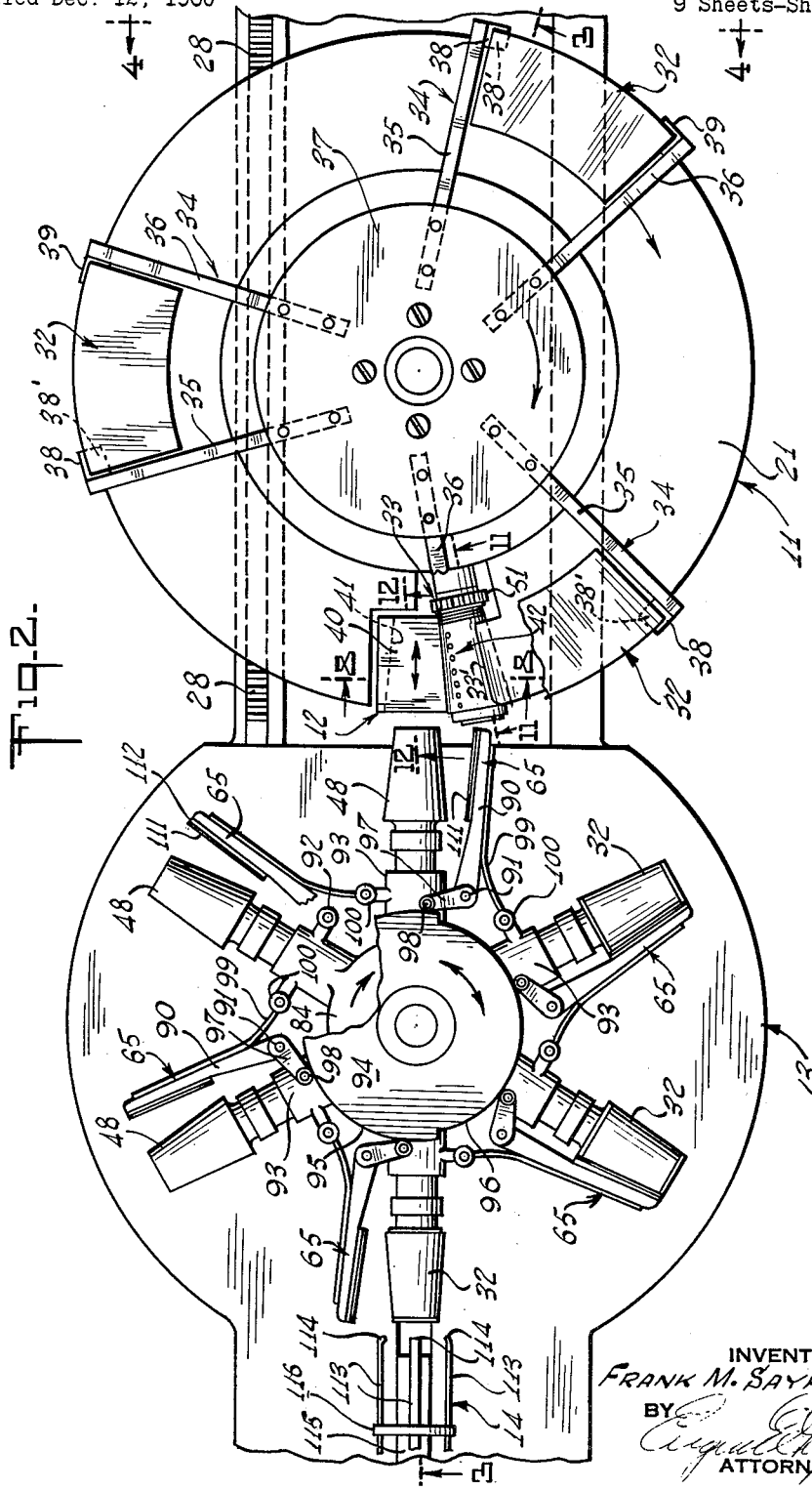

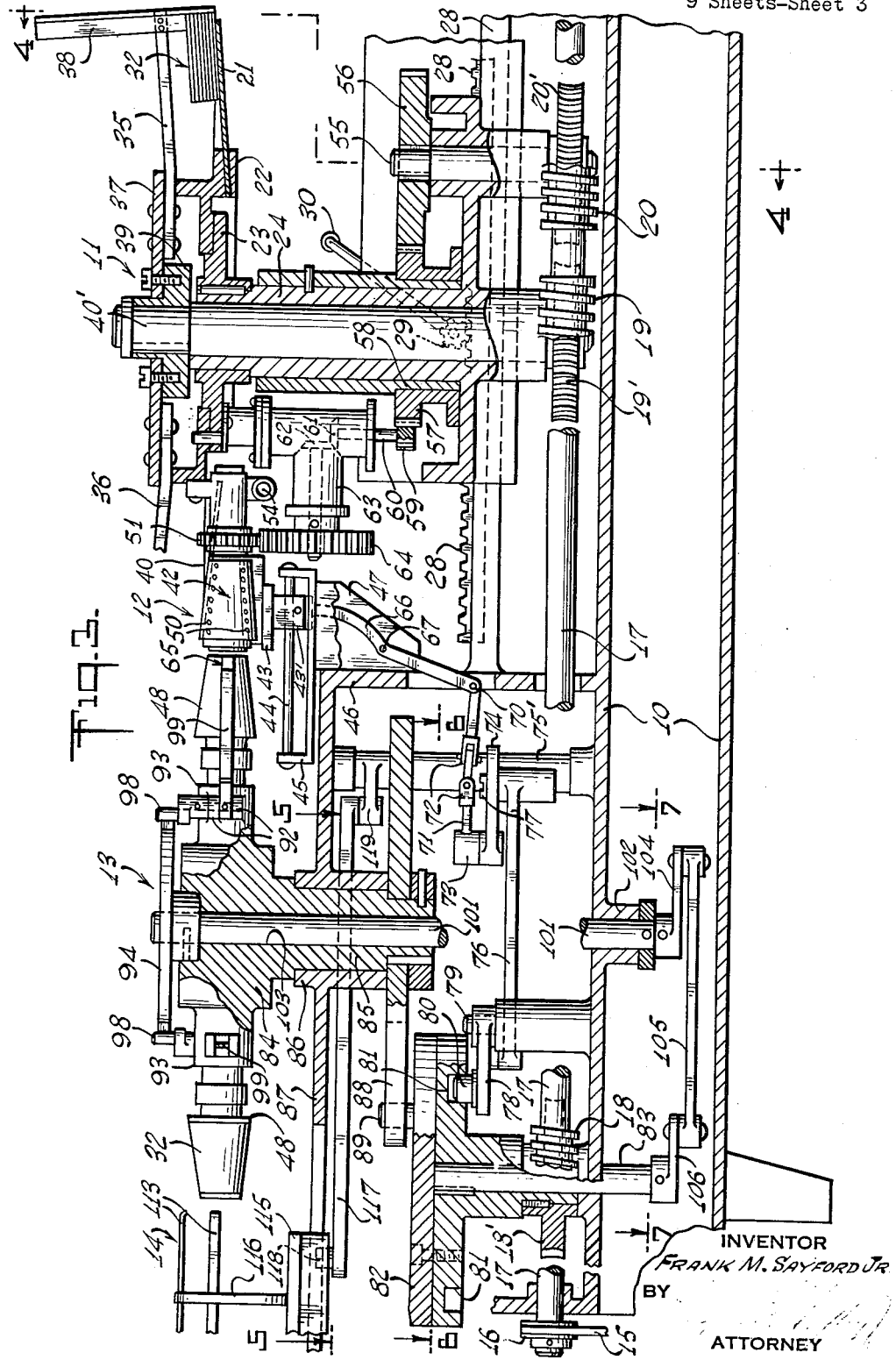

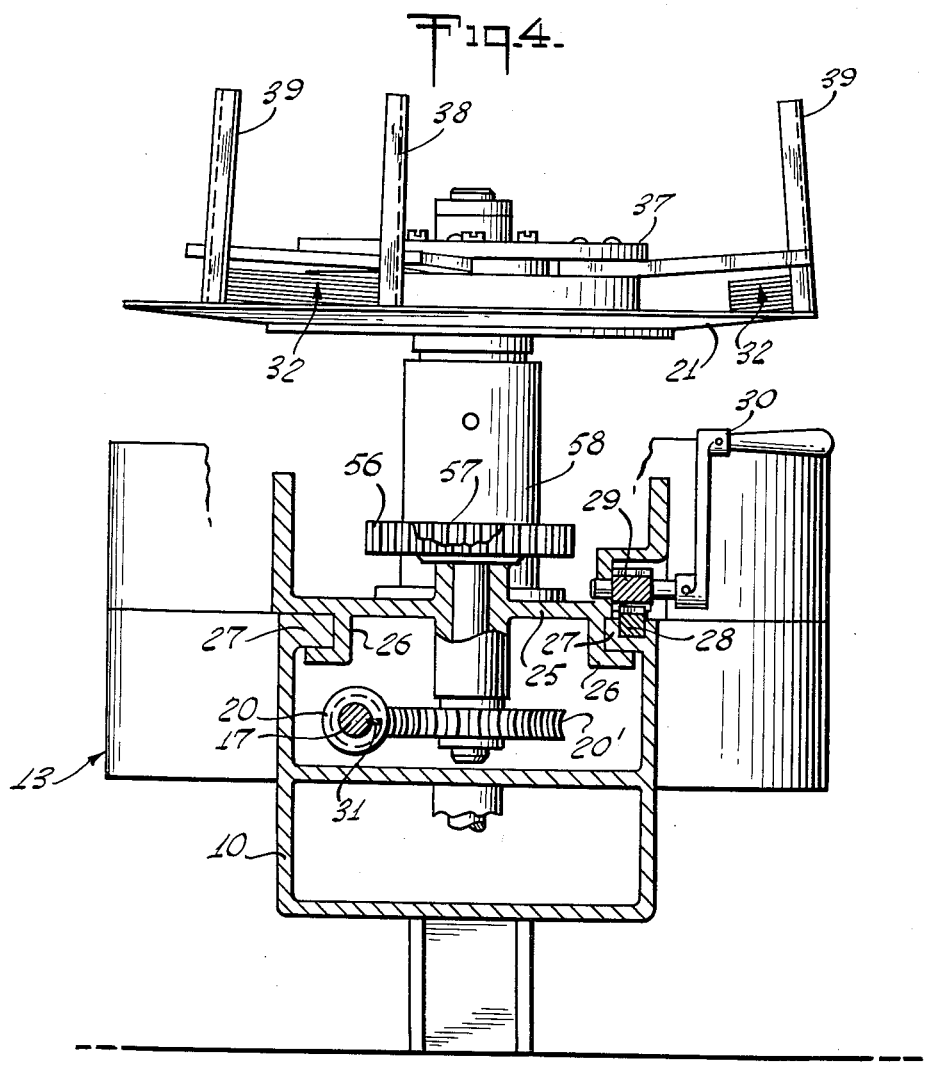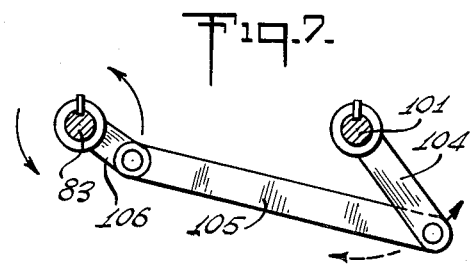

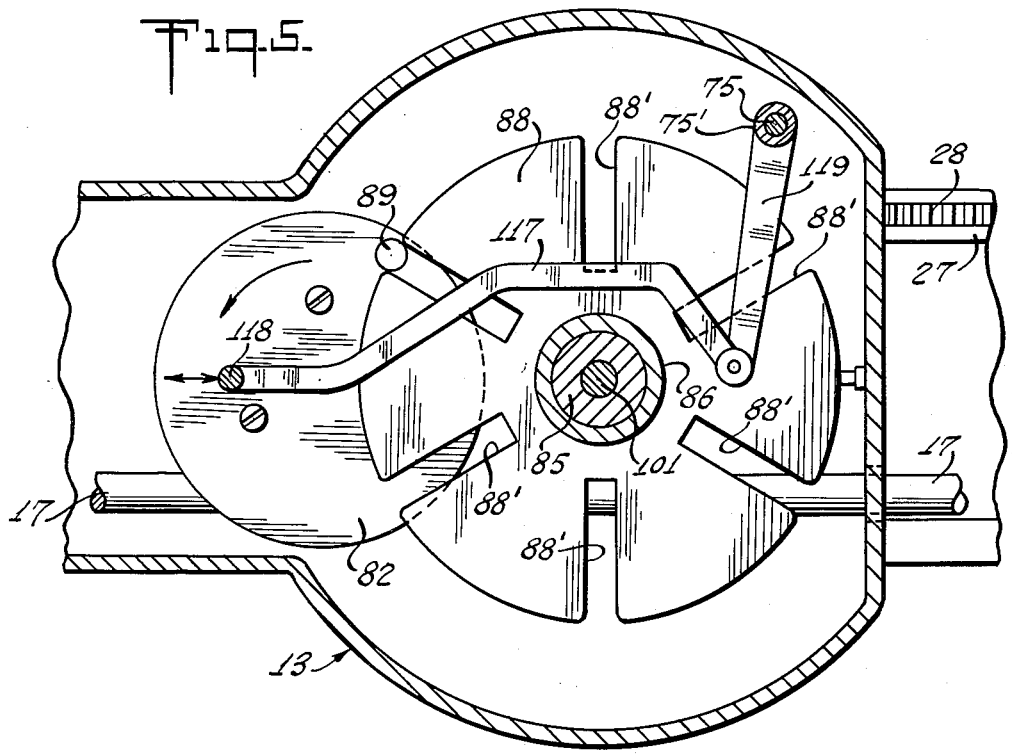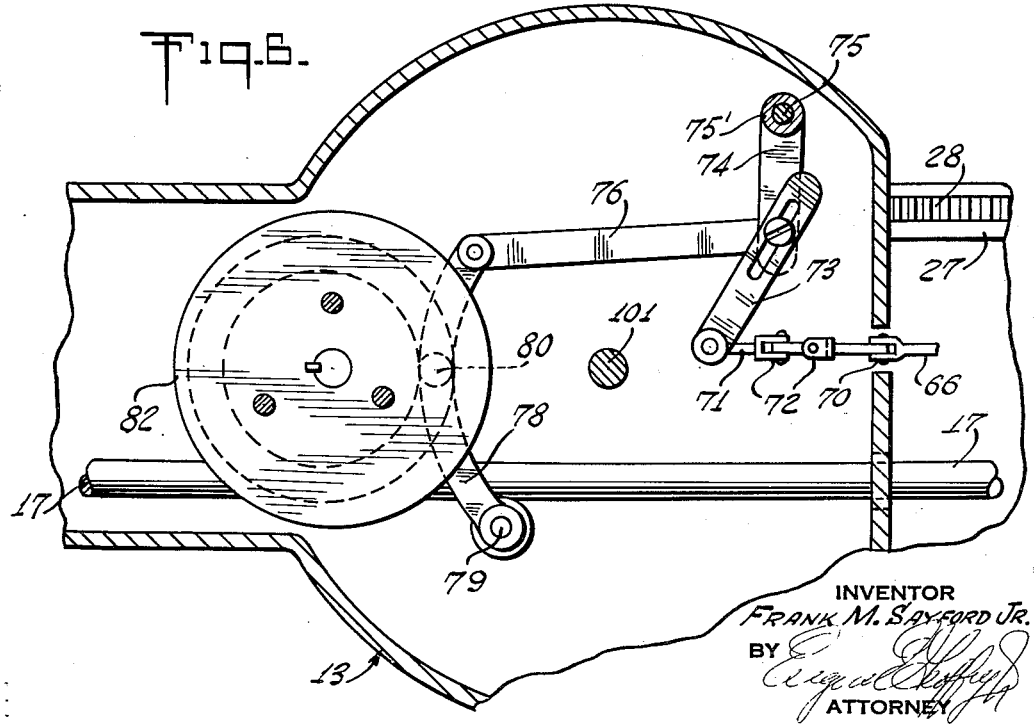

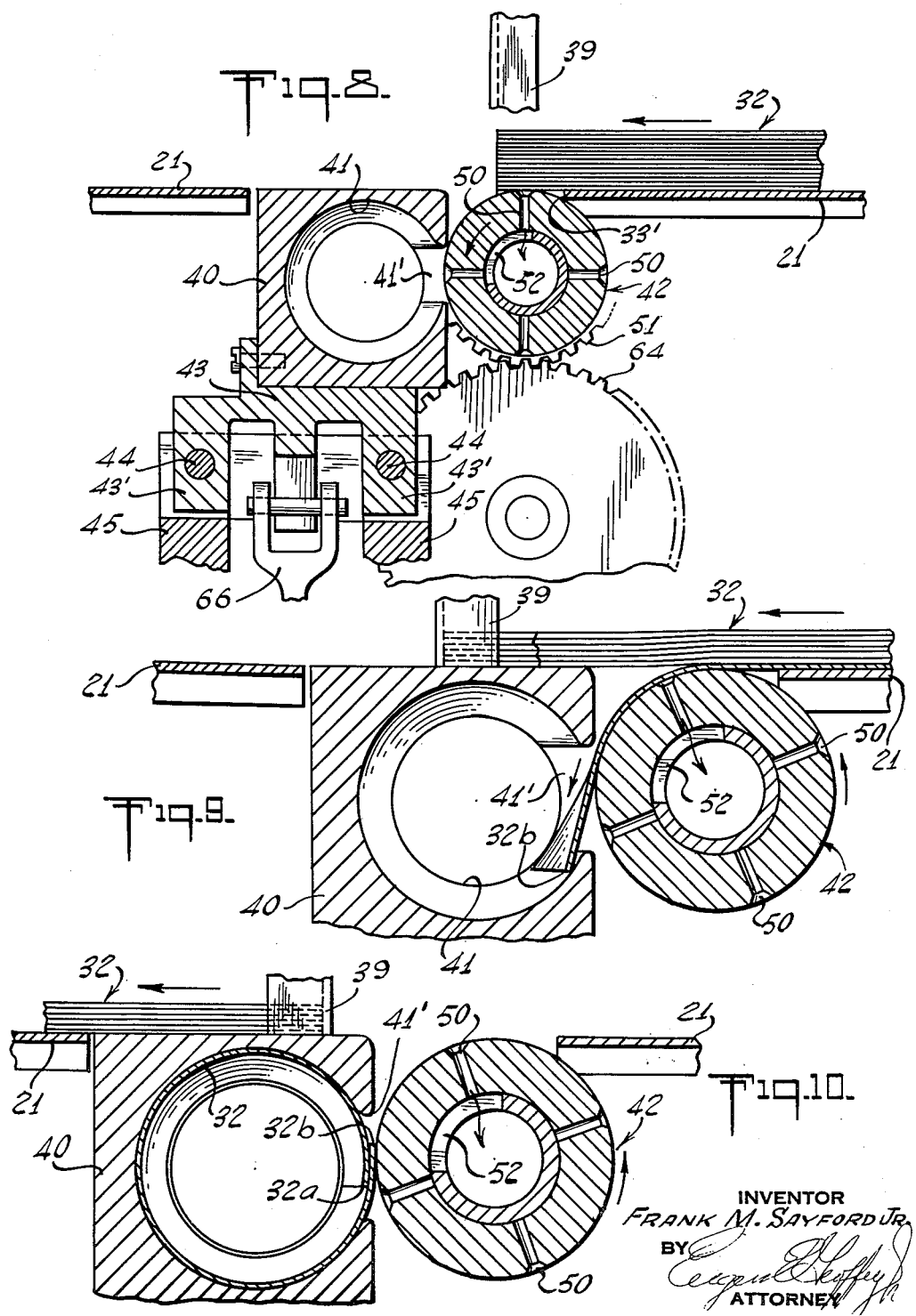

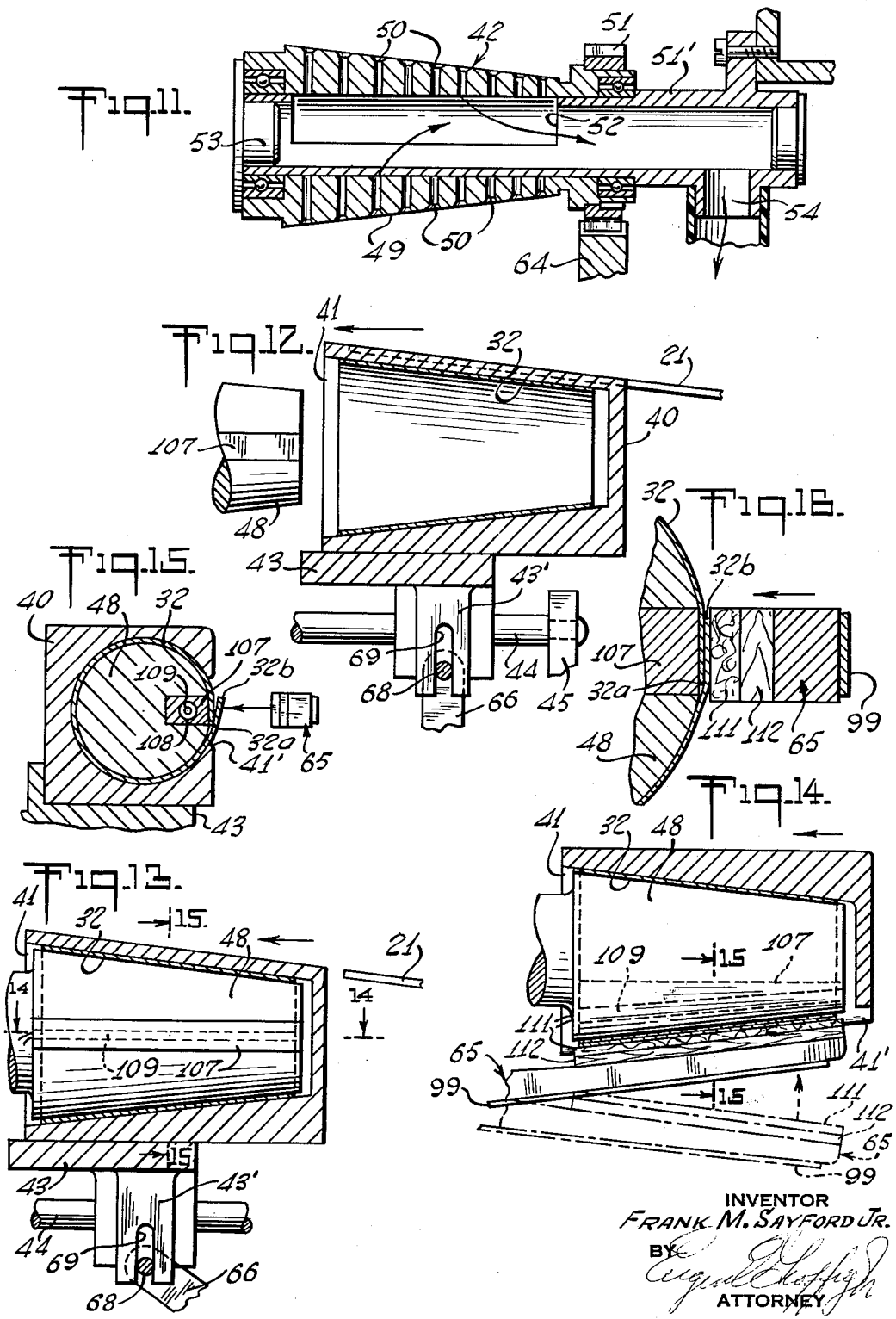

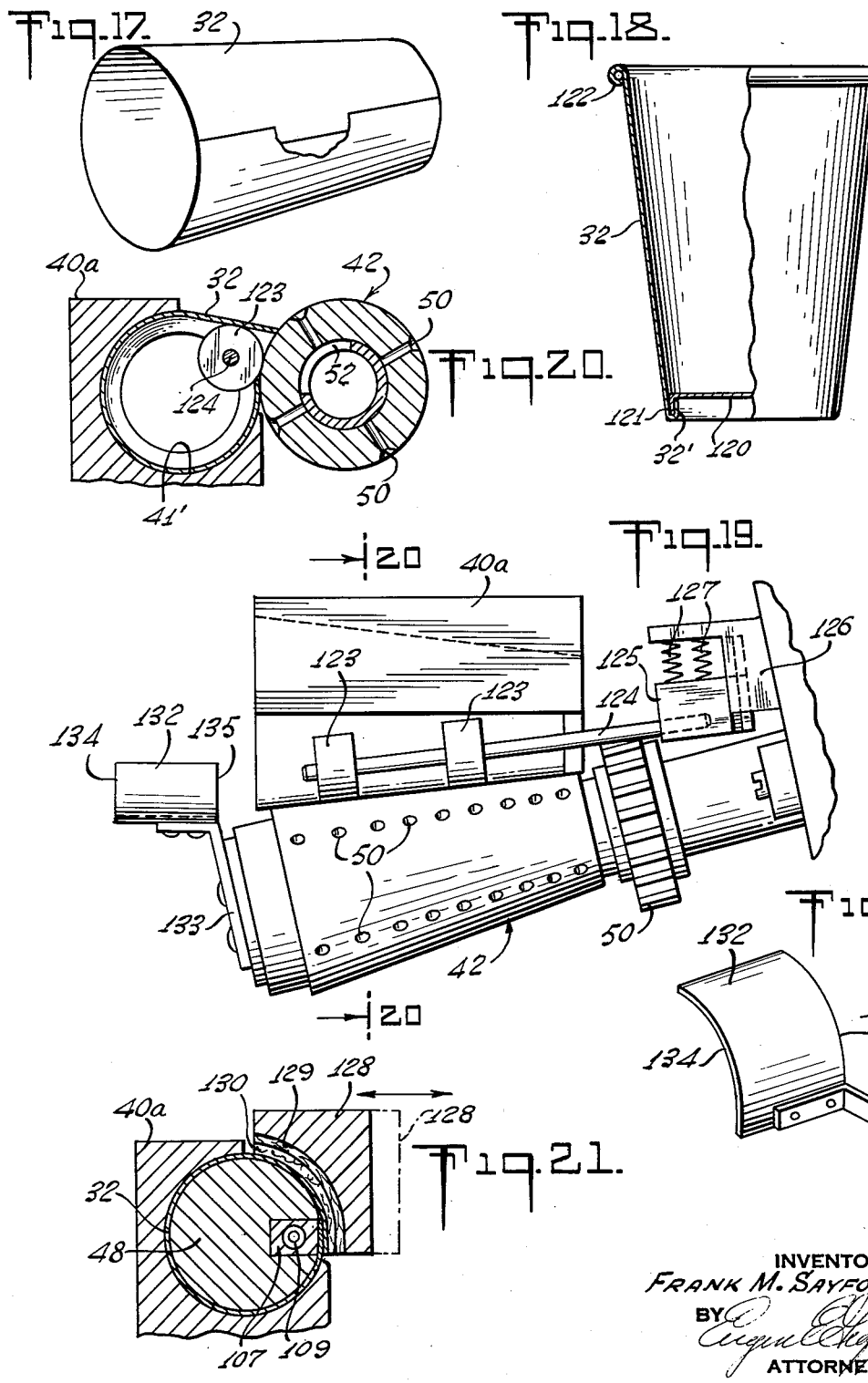

Aug. 21, 1962    F. M. SAYFORD, JR    3,049,979
CUP FORMING METHOD AND APPARATUS
Filed Dec. 12, 1960    9 Sheets-Sheet 9
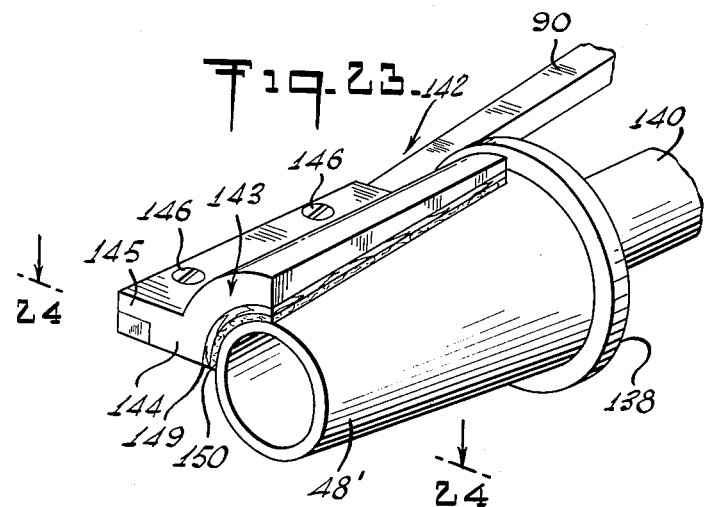
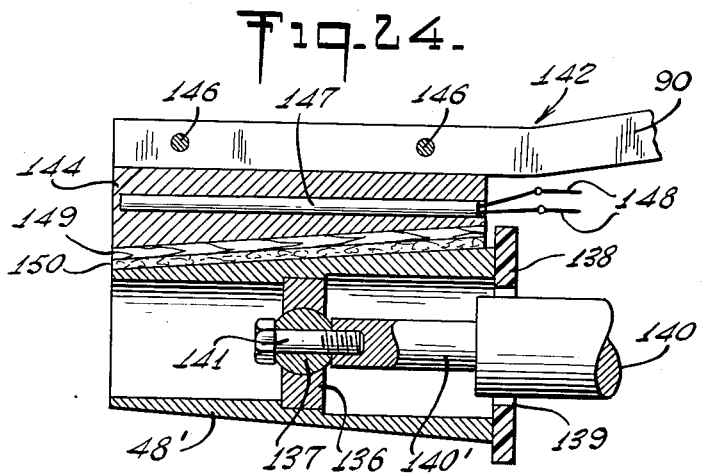
INVENTOR
FRANK M. SAYFORD JR.
BY
ATTORNEY United States Patent Office 3,049,979
Patented Aug. 21, 1962

3,049,979
CUP FORMING METHOD AND APPARATUS
Frank M. Sayford, Jr., Litchfield, Conn., assignor to Frank M. Sayford Company, Litchfield, Conn., a corporation of Pennsylvania
Filed Dec. 12, 1960, Ser. No. 75,216
16 Claims. (Cl. 93—39.3)

This invention pertains to the manufacture of cups and containers and pertains more specifically to an improved method and apparatus for forming tubular bodies of paper and other similar materials. While the invention is particularly applicable to the manufacture of paper drinking cups having an essentially frustoconical configuration, it will become apparent as the description proceeds that the invention is useful for making tubular structures of a wide variety of configurations.

Many procedures have been suggested for the manufacture of paper cups utilizing both multi-layered walls as well as so-called single-wrap structures but such procedures have been found to involve relatively complicated and expensive structures and which in the case of single-wrap machines operate at fairly low speeds since the overlapping edges of the wall must be held in tight engagement for a substantial length of time in order to assure the attainment of good seal. This invention overcomes the difficulties heretofore encountered in the formation of single-wrap cups of relatively heavy construction and provides a wholly automatic relatively high speed device for fabricating cup bodies from preformed blanks, sealing the overlapping edges of the wall, and discharging it for installation of the bottom and preparation of the top edge to receive a closure.

Another object of the invention resides in the provision of a novel and improved method and apparatus for forming cup bodies from prepared blanks which not only can be operated at relatively high speeds but also insures the fabrication of uniformly shaped bodies.

Another object of the invention resides in the provision of a novel and improved blank feeding method and apparatus which insures positive feeding of individual blanks from stack or stacks into the cup forming apparatus and the attainment of such positive feed at relatively high speeds.

A further object of the invention resides in the novel and improved apparatus for sealing the overlapping edges of the cup blank to form a cup body and discharging the finished body from the forming apparatus.

A still further object of the invention resides in the provision of a new and improved method for fabricating cup bodies.

A still further object of the invention resides in the novel and improved apparatus for fabricating cup bodies.

The above and other objects of the invention will become more apparent from the following description and the accompanying drawings forming part of this application.

In the drawings:

FIG. 2 is a top view of cup body forming apparatus in accordance with the invention;

FIG. 3 is a vertical longitudinal cross-sectional view of the apparatus shown in FIG. 2 and taken along the line 3—3 thereof;

FIG. 4 is an end view in partial section of the apparatus shown in FIGS. 2 and 3 and taken in the direction of the arrows 4—4 of FIG. 2;

FIG. 5 is a cross-sectional view of FIG. 3 taken along the line 5—5 thereof;

FIG. 6 is a cross-sectional view of FIG. 3 taken along 6—6 thereof;

FIG. 7 is a cross-sectional view of FIG. 3 taken along the line 7—7 thereof.

FIG. 8 is a cross-sectional view of the cup forming elements as shown in FIG. 2, taken along the line 8—8 thereof, and illustrating the initial step in feeding a blank into the cup forming apparatus;

FIG. 9 is a cross-sectional view similar to FIG. 8 and illustrates an intermediate step in the feeding of a blank into the cup forming means;

FIG. 10 is a cross-sectional view similar to FIGS. 8 and 9 showing a cup blank in position within the cup forming means;

FIG. 11 is a cross-sectional view of the blank feeding roller taken along the line 11—11 of FIG. 2;

FIG. 12 is a cross-sectional view of the blank forming means with a blank in position therein and taken along the line of 12—12 of FIG. 2;

FIG. 13 is a cross-sectional view of the cup forming means substantially as illustrated in FIG. 12 but with a forming mandrel in position within the cup body;

FIG. 14 is a cross-sectional view of the structure shown in FIG. 13 and taken along the line 14—14 thereof to illustrate gripping and sealing means urging the overlying edges of the body one against the other and against the mandrel;

FIG. 15 is a cross-sectional view of FIG. 14 taken along the line 15—15 thereof and with the cup gripping means in a disengaged position;

FIG. 16 is an enlarged fragmentary view similar to FIG. 15 and showing the cup gripping or clamping means in the cup engaging position;

FIG. 17 is a perspective view of a completed cup body;

FIG. 18 is a side elevation in partial section of a completed cup formed from the cup body shown in FIG. 17;

FIG. 19 is a top view of cup feeding and forming means in accordance with the modified embodiment of the invention;

FIG. 20 is a cross-sectional view of FIG. 19 taken along the line 20—20 thereof and showing a cup body within the forming means;

FIG. 21 is a view similar to FIG. 20 and illustrating modified means for clamping the edges of the cup body in overlying relationship;

FIG. 22 is a perspective view of the guide shown in FIG. 19 for directing the edges of the formed cup body beneath the clamping means;

FIG. 23 is a perspective view of a modified mandrel and cooperating clamp in accordance with the invention; and, FIG. 24 is a cross-sectional view of FIG. 23 taken along the line 24—24 of FIG. 23.

Figure 1:
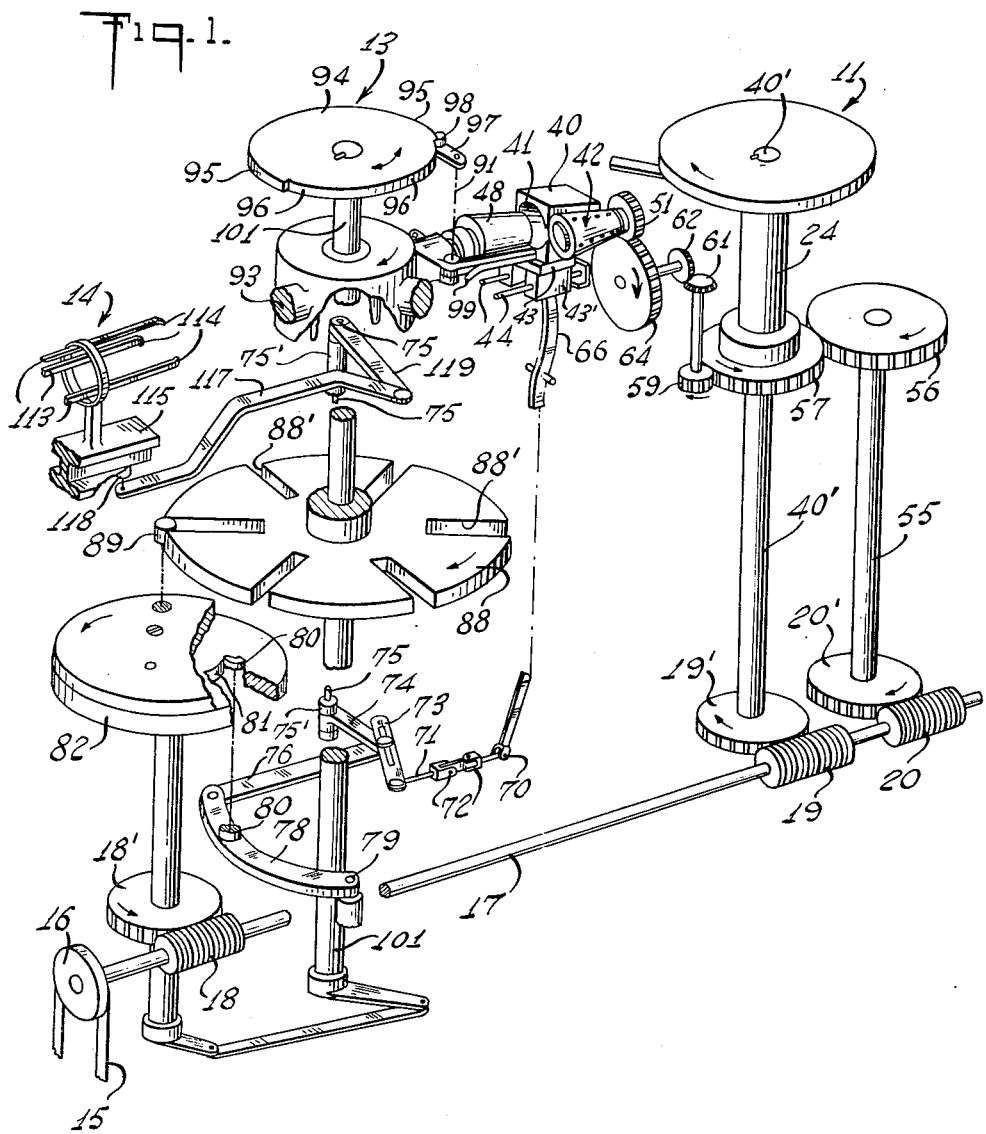
FIG. 1 is an expanded perspective view, in diagrammatic form, showing certain of the elements forming one embodiment of the invention in order to illustrate more clearly the manner in which they are coordinated to fabricate cup bodies.

Briefly, the illustrated embodiment of the invention pertains to an improved method and apparatus for forming cup bodies continuously and at relatively high speeds from preformed cup blanks. The blanks are inserted in the apparatus in the form of stacks and individual blanks are fed successively into cup forming means having an elongated recess in the form of the desired cup configuration. When the blank is fed into the forming means a male forming die, hereinafter called "mandrel," having the same configuration as the recess in the cup forming means, but somewhat smaller in diameter, is moved into firm engagement with the preformed cup body and the mandrel holds the blank firmly against the walls of the cup forming means. While the cup body is in this position, a clamp is moved into engagement with the overlapping edges of the cup body so that upon retracting of the mandrel from the cup forming means, the cup body will also be retracted. During this clamping period, heat may be applied to accelerate the sealing process particularly where thermoplastic or thermosetting resins are used to effect a permanent seal between the edges of the cup body. The cup remains on the mandrel for a pre-determined period to insure proper sealing of the overlapping edges of the cup body whereupon the clamping means is released and the finished cup body is removed from the mandrel.

Referring now to the drawings and more specifically to FIGS. 1 through 18 which illustrate one embodiment of the invention, the entire apparatus may be carried by a single bed or base 10 and includes blank feeding means generally denoted by the numeral 11, forming means generally denoted by the numeral 12, transporting and sealing means for the formed cups generally denoted by the numeral 13 and cup body removing and stacking means generally denoted by the numeral 14. These basic portions of the apparatus will be observed more clearly in FIGS. 2 and 3. For convenience, the structure and operation of the individual portions of the apparatus in accordance with the invention will be described in the order named above.

It will be observed that the entire apparatus in accordance with the invention may be driven by a single power source such as an electric motor or the like coupled by a belt 15 to a pulley 16 for driving the main power distribution shaft 17 as will be observed more clearly in FIGS. 1 and 3. The shaft 17 includes three power take-offs in the form of worm gears 18, 19 and 20 and cooperating spur gears 18', 19' and 20'.

Blank Feeding Means

Basically, the blank feeding means forming part of the illustrated embodiment of the invention comprises a circular plate 21 fixedly carried by annular bracket members 22 and 23, the latter being secured to an upwardly extending cylindrical member 24 carried by a frame element 25. The frame element 25 includes a pair of downwardly extending L-shaped elements 26 which slidably engage tracks 27 forming part of the machine base 10. For convenience in adjusting the apparatus and for purposes of maintenance, the frame member may be displaced longitudinally of the base 10 by means of the rack gear 28 fixedly secured to the base 10 and a pinion 29 rotatably secured to the frame 25 and rotatable by means of the crank 30. In order to facilitate adjustment of the blank feeding mechanism 11 relative to the remainder of the machine the worm gears 19 and 20 are slidably mounted on the shaft 17 and an elongated key 31 is provided to maintain the worm gears 19 and 20 in engagement with shaft at all times. Means are also provided on the frame 25 to prevent longitudinal displacement of the worm gears 19 and 20, though these means have been omitted in order to avoid undue complication of the drawings.

Referring again to the plate 21, it will be observed that the outer peripheral portion is dished upwardly and that the cup blanks generally denoted by the numeral 32 are carried at the outer periphery of the plate 21. A portion of the plate 21 is removed as indicated at 33 to accommodate the blank forming means 12 as will be described.

The cup blanks 32 are placed in the apparatus in the form of three individual stacks spaced at intervals of approximately 120 degrees and the stacks are moved about the periphery of the plate by three sets of blank retaining and feeding means, each set being denoted generally by the numeral 34. Each set of cup blank retaining and feeding means comprises a pair of arms 35 and 36 secured to a central plate 37 and extending outwardly therefrom. The angular relationship between the associated arms 35 and 36 is determined by the angular relationship of the end edges of the cup blanks. The outer ends of the members 35 and 36 carry upwardly extending angle members 38 and 39 which limit the outward movement of the cup blank stacks and the member 38 has a bottom plate 38' of relatively thin material that underlies the trailing corner of the stack in order to insure displacement of the entire stacks, as they are moved about the periphery of the plate 21.

The central stack rotating plate 37, as will be observed in FIG. 3, is carried by a central hub 39 secured to a vertical shaft 40' which extends through the column 24. The lower end of the shaft 40' carries the gear 19' which meshes with the worm gear 19 as previously described.

With this arrangement and during normal operation of the machine, the stacks of cup blanks 32 are carried continuously about the plate 21 and each time a stack passes over the cutout 33 in the plate, the bottommost blank is picked up by the cup forming apparatus to form a cup body.

Cup Body Forming Means

The cup blank forming means 12 comprises essentially a reciprocable block 40 having a central conical or tapered opening 41 which conical opening determines the outside diameter and configuration of the ultimate cup body. A conical vacuum feeding roller 42 which feeds successive cup blanks 32 into the conical opening 41 is positioned in cooperating relationship with the block 40.

More specifically the forming block 40 is secured to a carriage 43 slidably mounted on a pair of rods 44 and the latter are supported by a U-shaped member 45. The U-shaped member which has an elongated slot in the under side thereof, is carried by a pair of corner brackets 47 attached to frame member 46. The frame member 46 extends upwardly from the base or bed 10 of the machine and is fixedly secured thereto. Thus, under the conditions where the cup blank feeding apparatus may be displaced relative to the remainder of the apparatus, the forming block 40 will not be moved relative to the cup sealing and transporting means 13 which will be described.

In normal operation of the apparatus, the forming block 40 is reciprocated toward and away from the conical cup forming mandrels 48 forming part of the cup transporting and sealing means 13. It should be observed, however, that the mandrels 48 cooperate with the block 40 in the actual formation of the cup body and in this respect the mandrels 48 form, in effect, part of the cup body forming means.

With the block 40 in the retracted position as shown in FIGS. 1, 2 and 3, it is ready for the reception of a cup blank 32 which is to be fed into the opening 41 by means of the vacuum roller 42. The vacuum roller, as previously described, is generally conical in configuration and has a plane conical surface 49 with vacuum ports 50 spaced in one or more rows along the surface and communicate with an axially disposed opening extending through the roller body 49. The inner or smaller end of the roller body 49 carries a drive gear 51 which is fixedly secured thereto. This assembly is rotatably carried on a horizontal shaft 51 as illustrated in FIG. 11 and a portion of this shaft is slotted as indicated at 52 throughout a radial angle of approximately 90 degrees (see FIGS. 8, 9 and 10) and the outer end of the shaft is closed by a plate 53. The inner end of the shaft 51' includes an air outlet 54 for the purpose of applying suction to the roller and drawing air in through the vacuum ports 50. Since the shaft 51 has a cutout portion 52 extending throughout an angle of 90 degrees, with not more than four sets of angularly disposed rows of ports 50, it will be observed that vacuum will be fed to not more than two rows of ports 50, at any one time and normally, vacuum will be applied to only one of the rows of ports.

The vacuum roller assembly 42 is continuously rotated during the operation of the machine and this is accomplished through the medium of the worm gear 20 and the cooperating pinion 20'. The pinion 20' is carried by a shaft 55 as may be observed in FIGS. 1 and 3, the latter being rotatably mounted on the frame 25 (see FIG. 4). The upper end of the shaft includes a spur gear 56 which meshes with a second spur gear 57 rotatably carried by a journal 58 surrounding the column 24. Rotation of the spur gear 57 is then transmitted to the roller gear 50 by a gear 59, shaft 60, cooperating bevel gears 61 and 62, shaft 63 and spur gear 64 which meshes with the gear 50.

Operation of the roller 42 is phased with the angular displacement of the stacks of blanks 32 so that as a stack of blanks is fed past the edge 33' of the opening 33 in plate 21, a set of vacuum ports 50 engages and grips the leading edge of the lowermost blank 32 as shown in FIG. 8. As the roller 42 continues counterclockwise rotation, as shown in FIG. 8, the blank is fed downwardly and through a side opening 41' in the block as shown in FIG. 9. At this point a second set of vacuum ports 50 continues holding engagement with the blank and urges the blank further into a conical opening 41 of the block 40. This action continues until the edges of the blank 32 which are denoted by the numerals 32a and 32b are in overlapping relationship, as may be observed more clearly in FIG. 10 of the drawings. It will also be observed from FIGS. 8, 9 and 10 that the stack of blanks 32 is continuously moved past the roller 42 and this movement aids the roller in feeding blanks into the forming block 40. In FIG. 10 it will be observed that the stack of blanks 32 has completely passed the roller 42 and partially overlies the block 40.

As soon as the blank 32 is fed completely into the block 40, the block 40 is moved away from the blank feeding apparatus 11 (to the left, as illustrated in FIG. 3) and into firm engagement with the mandrel 48. At this point, however, the pressure arm denoted by the numeral 65 (see FIG. 2) and associated with the engaged mandrel 48, is in a position spaced away from the mandrel so that the mandrel 48 and the block 40 can be moved into engagement as shown in FIGS. 12 and 13. It will be noted that in FIG. 12 the cup blank 32 is disposed within the block 40 and the mandrel 48 is aligned with the block 40 preparatory to engagement and that in FIG. 13, the mandrel 48 is within the conical opening in the block 40. This action presses the cup blank 32 against the walls of the conical opening 41 of the block 40 to insure precise shaping of the cup blank prior to sealing or cementing the edges thereof.

Reciprocation of the block 40 is accomplished by a lever 66 as may be observed in FIG. 3, which is pivoted at 64 to the brackets 47. The upper end of the lever extends through a slot in the frame 45 and pivotally engages the lower portion 43' of the carriage 43. The particular configuration of the carriage 43' to receive the upper end of the lever 66 is illustrated more clearly in FIGS. 12 and 13. In these figures it will be observed that the carriage 43 has a pair of downwardly extending members 43' in spaced relationship one to the other to receive the upper end of the arm 66 therebetween. The arm 66 carries a pin 68 which rides in slots 69 in the member 43'. In this way angular movement of the arm 66 about the pivot 67 will reciprocate the carriage 43 and consequently the block 40.

The lower end of the arm 66 is pivotally secured at 70 to a rod 71 having universally movable links 72. The other end of the rod 71 is pivotally secured to a bracket 73 carried on the end of an arm 74 which is secured to a vertically disposed shaft 75 carried within a sleeve 75'. The arm 74 is oscillated by an arm 76 pivoted to the arm 74 at 77. An arcuate link 78 is pivoted to the left hand end of the lever 76 as shown in FIGS. 1 and 3 and the other end of the arcuate arm 78 is connected to a fixed pivot 79. The arm 78 further includes a cam follower roller 80 which rides in a cam slot 81 of the cam wheel 82. The cam wheel 82 is carried on the upper end of a shaft 83 rotatably carried by the frame 10 and including a pinion 18' which meshes with the worm gear 18 as previously described. Thus, rotation of the shaft 17 will continuously rotate the cam wheel 82 and produce periodic reciprocation of the block 40. A plan view of the linking mechanism for reciprocating the block 40 will be observed more clearly in FIG. 6 of the drawings.

After the mandrel 48 has been moved into engagement with the block 40 to fix the form of the cup body 32, the clamping arm 65 moves through the opening 41' in the side of the cup forming block 40 and presses the edges of the cup body 32 firmly one against the other as will be observed in FIG. 16. At this point the block 40 is moved away from the mandrel 48 and into the position shown in FIG. 2 preparatory to the receipt of the next blank 32 to be formed into a cup body. During this interval the cup sealing and transporting means 13 is automatically indexed to bring the next successive mandrel into position to complete the formation of the next successive cup body.

*Cup Body Sealing and Transporting Means*

The cup body sealing and transporting means in this embodiment of the invention includes a total of six male die members or mandrels 48 disposed uniformly about a central axis and each mandrel 48 is provided with a cooperating clamp 65 operated in a predetermined sequence phased with indexing of the mandrels 48 to effect the desired ends.

More specifically, the mandrels 48 are carried by and extend radially outwardly of a central hub 84, the latter having a downwardly extending shaft portion 85 rotatably carried in the bearing 86. The bearing 86 in the instant embodiment of the invention forms part of a horizontal frame member 84 fixedly carried by the base 10 of the machine. The lower end of the shaft 85 is fitted with a slotted indexing wheel 88 having six radially disposed slots 88'. The cam wheel 82 carries a driving pin or cam 89 which successively enters each slot, displaces the cam wheel 88 through an angle of 60 degrees and then leaves the slot for engagement of the next successive slot on the next succeeding rotation. In this way the mandrels 48 are successively indexed into position with the cup body forming head 40 and remain in position long enough to receive the cup body and to permit withdrawal of the head 40. Automatic synchronization of the two movements is effected by the cam wheel 82 which, as previously mentioned is driven from the shaft 17.

It was previously mentioned that each mandrel 48 is provided with an associated clamp 65 which is moved into engagement with a cup body on the mandrel 48 and remains in engagement with the cup body until just prior to removal of the finished cup body from the apparatus. Each of these clamps 65 consists of an elongated arm 90 pivotally secured at 91 to a bracket 92 forming part of a mandrel supporting collar 93 carried by the central hub structure 84. Overlying the hub 84 of the cup sealing and transporting means is a circular cam 94 having a peripheral part 95 of relatively large radius and extending through an angle slightly greater than 180 degrees. The remaining peripheral part 96, of the cam 94 is formed on a smaller radius and this cam functions to operate the clamping arm 65 in synchronism with the indexing of the head 84. Cooperation of the cam 94 with each clamping arm 65 is accomplished by an arm 97 which is secured to the arm 90 and operates in the nature of a bell crank. The outer end of the arm or lever 97 is provided with a cam wheel 98 and a spring 99 connected between the clamping arm 90 and a stud 100 on the collar 93. The spring urges the arm 90 toward its associated mandrel and holds the cam wheel in firm engagement with the periphery of the cam 94.

The cam 94 is operated by a vertically disposed shaft 101 which is carried by a journal 102 in the base 10 and extends upwardly through a central opening 103 of the hub 84. The bottom end of the shaft 101 is fitted with a lever 104 (see FIGS. 3 and 7), the upper end of which is pivotally attached to a link 105. The link 105 is reciprocated by an arm 106 substantially shorter than the length of the arm 104 and is carried on the lower end of the shaft 83 which depends from and is rotated by cam wheel 82.

With this drive mechanism the cam 94 oscillates through a predetermined angle and is timed so that the cam will be in the position shown, for instance, in FIG. 2 at the time the block 40 is moved into engagement with a mandrel 48. At this moment the cam 94 moves in a counter clockwise direction as viewed in FIG. 2, whereupon the cam follower wheel moves on to the cam portion 96 of smaller radius and permits the clamp 65 to press firmly against the cup body. As the cam 94 starts its clockwise motion, the hub 84 is simultaneously indexed in a clockwise motion so that the clamp 65 will remain in position against its associated mandrel 48. The closed position of the clamps may be observed in connection with the two lower mandrels as shown in FIGS. 2, it being understood that FIG. 2 is a plan view of the apparatus. As each mandrel reaches the cup body extracting mechanism, the associated clamp 65 is moved away from the mandrel 48 as the cam follower wheel 98 rides on to the cam portion 95 which is of larger radius. This permits the extracting mechanism 14 to move over the mandrel 48, grip the cup body and remove it from the mandrel. Each clamp remains in a disengaged position throughout the remainder of its travel until it is again closed as it moves into the cup body receiving position as previously described.

While cementing the overlying edges 32a and 32b of each cup body may be accomplished in any suitable manner, one effective procedure involves the utilization of a pressure and temperature sensitive adhesive. For this purpose each cup body is preferably provided with a suitable adhesive along one edge prior to placement on the feeding means so that when the cup body is formed in the block or head 40, the adhesive will lie between the overlying edges 32a and 32b. In the case of a temperature and pressure responsive adhesive, each mandrel 48 is provided with an elongated insert 107 having an opening 108 for reception of a heating element 109. The leads 110 connected with the element 109 for energizing it are connected to an insulated slip ring carried by the hub 84 in the conventional manner and energy is applied to the slip ring by cooperating brushes. The slip ring structure has not been illustrated in order to avoid undue complication of the drawings as the structure is so well known in the art that a detailed illustration is not deemed necessary.

It will be observed from FIGS. 13 and 15 that the elongated block 107 is positioned on each mandrel 48 so that it underlies the overlapping edges 32a and 32b of the cup body 32 and will therefore heat the overlying edges to effect permanent waterproof seal therebetween.

That portion of the clamp 65 which actually bears against the outer surface of the overlapping edges of the cup body is preferably covered by a resilient material in order to effect uniform pressure throughout the entire extent of the cup body. When both heat and pressure are applied to effect the sealing of the overlapping edges of the cup body, it is desirable that the resilient material on the surface of the clamp have a heat insulating characteristic to prevent unnecessary loss of heat during the sealing operation. One material that has been found satisfactory for this purpose is a natural or synthetic felt and this felt is denoted by the numeral 111 as shown in FIGS. 14 and 16. In order to facilitate the attachment of the felt to the clamp body 65, a strip of wood 112 may be applied to the clamp body and then the felt 111 cemented to the wood layer 112. While the utilization of a pad made up of overlying layers of wood and felt has been found most satisfactory, it is quite evident that any other suitable means may be employed in order to insure firm, uniform clamping pressure to effect a water tight seal between the overlying edges of the cup body. One form of cement that has been found useful is a water soluble resin having a polyvinyl acetate base. This is a temperature and pressure responsive adhesive and one which will function to firmly adhere the overlying edges of the cup body one on the other and will retain them in engagement during the cooling period after the clamping pressure has been released.

*Cup Body Extracting Mechanism*

The cup body extracting mechanism is indicated generally by the numeral 14 as shown in FIGS. 1 to 3, inclusive. In the illustrated embodiment of the invention this mechanism includes three elongated spring fingers 113 having inwardly formed end portions 114. The outer ends of the spring members define an opening slightly smaller in diameter than the enlarged portion of the cup body, while the elongated portions of the spring means 113 are approximately the same as the diameter of the large end of the cup body. In this way as each mandrel 48 arrives at the cup body discharge position, the spring members 113 are moved over the mandrel until the inwardly formed end portions 114 pass the inner or enlarged edge of the cup body. The members 113 are then moved outwardly away from the mandrel and in so doing carrying the cup body off the mandrel and retain it between the spring means 113. This procedure automatically stacks the cup bodies in a nesting relationship as well as removing them from the mandrels.

Operation of the spring members 113 as described above is accomplished by the utilization of a reciprocable carriage 115 slidably mounted on the frame member 87. Spring members 113 have an angular relationship one relative to the others of about 120 degrees and they are supported by one or more vertical supports 116 secured to and extending upwardly from the carriage 115. The carriage 115 is reciprocated by a link 117 secured at its left end, as shown in FIG. 3, to the carriage 115 by means of a pivot pin 118. The right hand end of the link 117 is pivotally secured to the outer end of a lever 119 carried by the vertical shaft 75 which is rotatably carried by the shaft 75. Rotation of the shaft 75 is effected as previously described by the links 75, 76 and 78, the latter having a cam follower 80 which is driven by the cam wheel 82. Thus, oscillation of the carriage 115 is maintained in precise synchronism with the indexing of the head 84, the carriage being reciprocated toward and away from each mandrel 48 during the period between successive indexing operations.

The apparatus thus far described utilizes both an improved method and an improved organization of elements to form cup bodies from paper and other similar materials and it enables the formation of such cup bodies with a minimum of operations and at relatively high speeds. The basic apparatus may be utilized to handle cup forming blanks of a wide variety of thicknesses, though when relatively heavy materials are utilized it may be desirable to provide auxiliary feeding means, as will be described in connection with FIGS. 19 to 22. Furthermore, by reason of the arrangement of the apparatus in accordance with the invention, it can be readily coordinated with an associated apparatus such as that used in forming the blanks that are fed into the instant apparatus as well as with machines for completing the forming of the cup by attaching a bottom portion to the cup and rolling the top edge. While the cup body may be completed in several ways, one such procedure is shown in FIG. 18. More specifically, the cup body 32 of FIG. 17 is provided with a bottom portion 120 having a surrounding depending edge 121. The bottom is cemented in place on the smaller end of the cup body 32 and the lower edge 32' of the cup body 32 is folded inwardly to effect a seal. The top edge of the cup body 32 is then rolled as indicated at 122 to complete the cup.

Referring now to FIGS. 19 through 22 which illustrate an alternate embodiment of the invention, it will be observed that these figures pertain essentially to the means for feeding cup blanks into the block 40. In this embodiment of the invention the block is denoted by the numeral 40a, and has essentially the configuration of the block 40 except that a longitudinal sector having an angular width of somewhat greater than 90 degrees is removed from the block. The vacuum roller 42 is positioned relative to the block in the same manner as illustrated and described in the previous embodiment of the invention and, in addition, two auxiliary rollers 123 are held in engagement with the vacuum roller 42. The rollers 123 are carried in spaced relationship by the shaft 124 and the latter is supported by a slidably mounted bracket member 125. While the bracket member 125 may be mounted in any desirable manner to urge the rollers 123 against the roller 42, in the instant embodiment the bracket member 125 slidably engages a suitable keyway in a fixed support 126 carried by the frame of the apparatus and springs 127 operate to urge the bracket member 125 and consequently the rollers 123 toward the roller 42. With this arrangement and from the description of the prior embodiment of the invention, it is evident that as the vacuum roller picks up a blank for movement into the block 40a, the blank will pass between the rollers 123 and 42 and thereby effect a more positive drive for directing the blank into the block recess 48'. When the cup body is positioned in the recess as illustrated in FIG. 20, the block is then moved outwardly away from the rollers 123 and 42 as previously described and in engagement with the mandrel 48. At this time the sealing means is brought into engagement with the cup body to seal the overlapping edge thereof. The sealing means or clamp in this embodiment of the invention differs from that previously described in that it constitutes in effect a sector of slightly smaller angular width than the section of the block 40a which was removed to provide space for introducing the rollers 123. This clamp is shown in FIG. 21 and denoted by the numeral 128. The inner face 129 of the clamp 128 is curved to conform with the desired configuration of the cup body and may include felt or other resilient padding 130 similar to that carried by the clamp 65 shown, for instance, in FIG. 2.

The operation of the clamp 128 of FIG. 21 is substantially identical to the clamp 65 of FIG. 2 and may be actuated in the same manner by the central cam 94 and associated cam following elements 97 and 98. This embodiment of the invention enables the utilization of cup blanks of fairly heavy material and insures positive insertion of the blank into the recess 41' of the block 40.

In certain cases, and particularly, with blanks formed of very heavy material, the leading edge of the blank 32 as shown in FIG. 20 may extend almost horizontally from the block 40a and means in the form of a tapered guide is provided to insure proper engagement of the extending portion of the cup body with the clamp 128. More specifically, a tapered guide 132 is employed as illustrated in FIGS. 19 and 22 and is supported by a fixed bracket 133 secured to the outer end of the shaft carrying roller 42. The leading edge 134 of the guide extends to a point in close proximity to the clamps 128 as they are indexed and the radius is slightly smaller than the inner radius of the clamps. The radius of the right hand edge 135 of the guide may be fairly large and this edge of the guide is positioned above the top edge of the cup body. In this way the guide will function to curve the leading edge of the blank about the mandrel and direct it beneath the clamp 128.

FIGS. 23 and 24 show a modified construction of the mandrel and cooperating clamp for sealing the edges of the formed blank one to the other to form a conical cup body. The mandrel denoted herein by the numeral 48' is essentially hollow and has a central transverse member 136 carrying an axially disposed ball 137 that is angularly movable relative to the transverse member 136. The larger end of the mandrel 48' carries a circular plate 138 having an opening 139 through which a supporting rod 140 extends. That portion of the rod 140 disposed within the opening 139 is relatively large in diameter and cooperates with the opening 139 to limit relative angular motion of the mandrel 48'. The mandrel 48' is secured to a cylindrical extension 140' carried by the support 140 by means of a bolt 141 which extends through the ball 137 and threadedly engages the extension 140'.

With the foregoing arrangement any slight misalignment of the cooperating block 40 previously described will not affect the attainment of accurate alignment of the mandrel 48' with the cavity in the block 40 in order to insure accurate formation of the blanks.

The provision for angular movement of the mandrel 48' also insures accurate alignment of the mandrel with the cooperating clamping means denoted herein by the numeral 142. This clamp is similar to the clamps previously described and is supported by an elongated member 90, which corresponds to the numeral 90 shown in FIG. 2. This member carries the clamping head generally denoted by the numeral 143 which is essentially in the shape of a quadrant 144, having an outwardly extending plate 145 secured to the member 90 by means of screws 146. The arcuate section or quadrant 144 has an opening extending therethrough for the receipt of a heating element 147, which corresponds essentially to the heating element 109 as shown in FIG. 13. This heater has a pair of leads 148 which are connected to a source of energy for maintaining the clamp 142 at the desired temperature. As in the case of the previous embodiment of the invention, the clamp 142 may include underlying layers of wood and felt 149 and 150, respectively, which bear directly against the overlying edges of the blank to firmly press one against the other to effect the seal.

While only certain embodiments of the invention has been illustrated and described, it is evident that changes, alterations and modifications may be made without departing from the true scope and spirit as defined by the appended claims.

What is claimed is:

1. Apparatus for forming pre-cut blanks of paper and similar materials into tubular bodies comprising a forming block having a recess therein with a configuration corresponding to the shape and size of the body to be formed, said block further including a side opening extending from the outer surface of the block to said recess, means for feeding a pre-cut blank through said side opening and into said recess with said blank lying in close proximity to the walls of the recess and the ends of the blank in overlying relationship and in substantial alignment with said side opening, a mandrel having a configuration corresponding to the internal dimensions of the body, means for effecting reciprocable movement between said block and mandrel to firmly seat the mandrel in said recess with the blank interposed between the surfaces of the mandrel and recess and to move said mandrel out of said recess in another position, means carried by said mandrel for clamping the ends of the blank against said mandrel when the latter is in said recess to secure the ends of the blank one to the other, said clamping means being retained in the clamped position until removal of the mandrel from said recess with the formed blank thereon, and means for releasing said clamping means for removal of the completed body from said mandrel.

2. Apparatus for forming tubular bodies of paper and similar materials from pre-cut blanks comprising a block having a recess therein of a configuration corresponding to the shape of the body to be formed, said block further including a side opening having a length at least equal to the depth of said recess, means for feeding a pre-cut blank through said side opening and into said recess with the ends of the blank in overlying relationship, a mandrel including a support therefor having a configuration corresponding to the internal shape of the body being formed, means for effecting relative movement between said mandrel and block to move said block from a position spaced from the mandrel to a position wherein the mandrel is seated within said block, said mandrel when seated in said block retaining said blank firmly between the surfaces of the mandrel and recess, and means for clamping the overlapping ends of the blank against said mandrel whereupon withdrawal of the mandrel from said recess will effect withdrawal of said formed blank.

3. Apparatus according to claim 2 wherein said feeding means includes a vacuum roller positioned adjoining said side opening and means for moving a blank into surface contacting engagement with said roller whereby the leading edge of said blank is drawn against said roller and said roller directs said leading edge of the blank through said side opening and into said recess.

4. Apparatus according to claim 2 wherein said mandrel is angularly movable relative to the support therefor.

5. Apparatus for fabricating tubular bodies from preformed blanks of paper and similar materials comprising blank forming means having a blank receiving recess and an opening for feeding a blank edgewise into said recess, means for feeding said blank into said recess with the leading edge of said blank contacting and being guided by the surface of said recess until said leading edge is in lapping relationship with the trailing edge, means urging said blank snugly against the walls of said recess to form said tubular body and means for securing said lapped edges of the formed tubular body one to the other to comlete formation of said body.

6. Apparatus for fabricating tubular bodies from preformed blanks comprising a forming member having a cavity therein of a configuration corresponding to the tubular body to be formed, means in said member for feeding a blank endwise into said cavity, a roller including vacuum ports positioned in close proximity to the last said means, the vacuum ports in said roller picking up a blank and directing the blank into said cavity with the blank ends in overlying relationship, means engaging said blank in the cavity to complete the formation thereof, and sealing means for sealing the overlying ends of said blank.

7. In apparatus for forming tubular bodies from precut blanks comprising a block having a blank receiving cavity formed into one surface thereof, said block further including an opening in another surface thereof and intersecting said cavity, said opening accommodating said blank to permit the latter to be fed into said cavity and formed into a tubular body with two edges in overlapping relationship and clamping means movable through said opening to seal said edges one to the other to complete the formation of said blank into a tubular body.

8. Apparatus for forming tubular bodies from precut blanks comprising blank forming means for receiving and preliminarily forming a blank, means for supporting and moving at least one stack of blanks past said blank forming means, means for picking up a blank from said stack as it is moved past said blank forming means and directing it edgewise into said forming means, a turret including a plurality of body forming mandrels carried thereby, means for successively moving said forming means into engagement with said mandrels to fixedly shape each blank introduced into said forming means, and means carried by said turret for clamping said formed blanks to the mandrels whereby withdrawal of a mandrel from the forming means will withdraw the formed blank.

9. Apparatus for forming tubular bodies according to claim 8 wherein said pick-up means comprises a roller having vacuum ports therein and said blank forming means is movable from a blank receiving position into engagement with said mandrels.

10. Apparatus for forming tubular bodies according to claim 8 wherein said blank pickup means comprises at least two cooperating rollers with at least one of said rollers including vacuum pick-up ports, and wherein each blank is moved between said rollers and forceably introduced into the forming means.

11. Apparatus for forming tubular bodies from preformed blanks comprising a body forming block having a blank receiving cavity therein, said block further having a side opening for introducing blanks successively into said cavity, roller means for feeding successive blanks into said cavity with the leading and trailing edges in overlapping relationship and in registry with said side opening, a turret having a plurality of body forming mandrels thereon, means for periodically indexing said turrent to successively align each mandrel with said cavity, the successive alignment of said mandrels with said cavity being coordinated with said roller feeding means whereby a blank is fed into said cavity at the time each mandrel is aligned therewith, means for periodically moving said block toward the aligned mandrel to engage the mandrel with the blank in the cavity and fix the conformation of the blank, a clamp associated with each mandrel, cam operating means for moving the clamp associated with the aligned mandrel through said side opening and into engagement with the overlapping edges of the blank to force the edges tightly one against the other and against the mandrel, said block moving means retracting said block to clear the mandrel with the formed blank thereon for movement out of alignment with said block, said cam means then releasing said clamp and extracting means coordinated with the movement of said mandrels for successively removing completed bodies from said mandrels.

12. Apparatus according to claim 11 including means for feeding blanks successively to said roller means comprising a circular plate-like member, said member having cut-out portion aligned with said roller means and block, and means for holding at least one stack of blanks and moving them in a continuous path about said circular member and past said roller means, said roller means picking off the lower-most blank of said stack and feeding it to said block each time the stack is moved past the roller means.

13. Apparatus for forming tubular bodies from preformed blanks comprising a block having a cavity therein of a depth corresponding to the length of the body being formed, said block further having a side portion thereof removed to provide a side access opening to said cavity, an elongated roller positioned adjoining said side access opening, a second roller adjoining the first said roller, means for introducing a blank to be formed between said rollers, said rollers engaging the blank and feeding it into said cavity with the ends of the blank at said side access opening, a mandrel, means for moving the mandrel and block one relative to the other to position the mandrel in the cavity to form the blank into a tubular body, a clamp associated with said mandrel and having a concave portion corresponding to the curvature of the tubular body, means for guiding at least one end of the blank into overlapping relationship with the other end of the blank and beneath said clamp as the mandrel and block are moved into engagement one with the other, and means actuating the clamp to press the ends of the body one against the other and against the mandrel, said moving means being operable to disengage the block and mandrel to remove the completed tubular body from said cavity.

14. Apparatus according to claim 13 wherein said block is moved relative to said rollers and into engagement with said mandrel, and wherein said guiding means is fixed relative to said rollers.

15. The method of making tubular cup bodies comprising the steps of forming a blank of sheet material, introducing said blank edgewise into a forming cavity until the leading edge is in lapping relationship with the trailing edge, fixing the configuration of said body by pressing the blank tightly against the walls of the cavity, and while said blank is pressed against the cavity walls sealing the ends of the blank one to the other.

16. The method of making tubular cup bodies comprising the steps of forming a blank of sheet material, introducing said blank edgewise into a forming cavity, with the ends positioned for attachment one to the other, fixing the configuration of said body by pressing the blank tightly against the walls of the cavity, clamping said ends one against the other and while said ends are clamped removing the body from said cavity and completing the sealing of said ends one to the other.

References Cited in the file of this patent

UNITED STATES PATENTS

| | | |
|---|---|---|
| 2,584,542 | Brown | Feb. 5, 1952 |
| 2,819,659 | Scott et al. | Jan. 14, 1958 |